(12) United States Patent
Francini et al.

(10) Patent No.: US 9,602,854 B2
(45) Date of Patent: Mar. 21, 2017

(54) METHOD AND SYSTEM FOR SYNCRONIZING ELECTRONIC PROGRAM GUIDES

(75) Inventors: Gianluca Francini, Turin (IT); Nicola Adami, Brescia (IT); Sergio Benini, Brescia (IT); Riccardo Leonardi, Brescia (IT)

(73) Assignee: TELECOM ITALIA S.p.A., Milan (IT)

( * ) Notice: Subject to any disclaimer, the term of this patent is extended or adjusted under 35 U.S.C. 154(b) by 221 days.

(21) Appl. No.: 13/976,773

(22) PCT Filed: Dec. 29, 2010

(86) PCT No.: PCT/EP2010/070865
§ 371 (c)(1),
(2), (4) Date: Jun. 27, 2013

(87) PCT Pub. No.: WO2012/089251
PCT Pub. Date: Jul. 5, 2012

(65) Prior Publication Data
US 2013/0276033 A1   Oct. 17, 2013

(51) Int. Cl.
*G06F 3/00* (2006.01)
*G06F 13/00* (2006.01)
(Continued)

(52) U.S. Cl.
CPC ... *H04N 21/26283* (2013.01); *H04N 5/44543* (2013.01); *H04N 21/23418* (2013.01); *H04N 21/2625* (2013.01); *H04N 21/8456* (2013.01)

(58) Field of Classification Search
CPC ....... H04N 21/26283; H04N 21/23418; H04N 21/8456; H04N 21/2625; H04N 21/4302; H04N 348/50–348/551
See application file for complete search history.

(56) References Cited

U.S. PATENT DOCUMENTS 7,565,104 B1    7/2009  Brown et al.
2002/0188945 A1*  12/2002  McGee et al. .................. 725/39
(Continued)

FOREIGN PATENT DOCUMENTS

EP    1 622 371    2/2006
GB    2 466 692    7/2010

OTHER PUBLICATIONS

International Search Report Issued Sep. 26, 2011 in PCT/EP10/070865 Filed Dec. 29, 2010.

*Primary Examiner* — John Schnurr
*Assistant Examiner* — Patrick A Ryan
(74) *Attorney, Agent, or Firm* — Oblon, McClelland, Maier & Neustadt, L.L.P.

(57) ABSTRACT

A method for generating a time scheduling of a contents stream distributed to plural terminals. The contents stream is segmented in consecutive segments, each segment defining a corresponding program. The method includes: receiving auxiliary metadata including a planned time scheduling of the content stream which has been set in advance and monitoring at least a portion of a segment of the contents stream to extract corresponding content features therefrom, generating a corresponding fingerprint based on the extracted content features and assessing at least one among an actual start time and an actual end time of such segment based on a comparison between the fingerprint and a reference fingerprint associated with such segment, and updating the planned time scheduling based on the assessed at least one among the actual start time and actual end time to generate a time scheduling synchronized with the contents stream.

13 Claims, 9 Drawing Sheets

(51) Int. Cl.
*H04N 5/445* (2011.01)
*H04N 21/262* (2011.01)
*H04N 21/234* (2011.01)
*H04N 21/845* (2011.01)

(56) References Cited

U.S. PATENT DOCUMENTS

| | | | |
|---|---|---|---|
| 2004/0078811 A1* | 4/2004 | Urdang | 725/44 |
| 2007/0157250 A1* | 7/2007 | Morris | 725/58 |
| 2007/0183743 A1* | 8/2007 | Tanikawa et al. | 386/83 |
| 2008/0127244 A1* | 5/2008 | Zhang | H04N 5/147 725/32 |
| 2008/0134251 A1* | 6/2008 | Blinnikka | 725/58 |

* cited by examiner

METHOD AND SYSTEM FOR SYNCRONIZING ELECTRONIC PROGRAM GUIDES

BACKGROUND OF THE INVENTION

Field of the Invention

The present invention relates to the field of the broadcast transmissions for the distribution of audio and/or video contents, and particularly it relates to Electronic Program Guides (EPG) for such broadcast transmissions.

Description of the Related Art

From now on, with the generic term of "broadcast transmission" it will be intended the distribution of identical audio and/or video contents to a same group of viewers. Actually, the term "broadcast transmission" implies that the recipients of the audio and/or video contents coincides with the totality of viewers capable of receiving such contents; if the recipients of such transmission are a subgroup thereof, a more correct term would be "multicast transmission"; however, for the sake of conciseness, the term "broadcast transmission" will be indistinctly employed for describing both the two abovementioned cases.

This distribution of audio and/or video contents may be carried out by means of radio frequency signals (such as in the terrestrial television, in the satellite television or in the cable television), and/or by exploiting a packet-switched network infrastructure like the Internet (such as in the Internet Protocol Television (IPTV)).

A segment of audio and/or video contents transmitted by a broadcasting center—or, simply, "broadcaster"—define a corresponding program, such as a television show, a film, an episode of a television series or a news show. Typically, the programs are organized by the broadcaster in a daily, weekly, or season-long schedule, also referred to as time scheduling.

A broadcast transmission of a program may provide for the simultaneous distribution of the audio and/or video contents together with auxiliary metadata giving information about the contents itself. Particularly, in the modern broadcast transmissions complying with the Digital Video Broadcasting (DVB) standards suite, information about the time scheduling is transmitted simultaneously with the audio and/or video contents in the form of a so-called Electronic Program Guide (EPG).

An EPG is an on-screen guide exploitable by the user (generally referred to as the "television viewer") for navigating the time scheduling in order to obtain information regarding the programs to be transmitted, such as their scheduled start/end times, the durations thereof, the channel on which they will be transmitted and so on. Through an EPG, a television viewer may advantageously set a Personal Video Recorder (PVR)—i.e., a device that is able to record audio and video contents to a disk drive, an USB flash drive, a memory card or other memory mediums—so as to plan in advance the recording of programs to be transmitted in a later time. Moreover, the services offered by an EPG may be advantageously exploited by other apparatuses, such as set-top box systems, Digital Media Receivers (DMR) and media centers.

Whether the EPG is transmitted within the broadcast stream—i.e., conveyed on the same communication channel through which the audio and video contents are distributed—or it is conveyed on a dedicated communication channel, the updating thereof is typically performed from time to time, and not necessarily every time a new program is started. Thus, the audio and/or video contents that are actually transmitted may correspond to a program that is different from the one indicated in the time scheduling provided by the EPG; typically, the program actually transmitted may correspond to the program that precedes or follows the program provided by the EPG. This difference may be caused by several factors, such as a commercials' duration modification or a sudden removal of a complete scheduled program.

Therefore, the information provided by the EPG generally does not fully correspond to the actual audio and/or video contents that are transmitted. In other words, the EPG is generally desynchronized with the actual broadcast transmission. The arise of a temporal gap between the time scheduling provided by the EPG and the actual broadcast transmission negatively affects any possible two-way interactivity between television viewers and broadcasters. Indeed, from the television users' side, the efficiency of EPGs in the setting of PVRs become more scarce; on the other side, the broadcasters are no more able to efficiently monitor the television users' activity (i.e., the identification of which programs were actually viewed by the television viewer) based on the EPG information.

In order to increase the reliability of EPGs, two different main approaches have been employed in the art.

Specifically, according to a first known approach, a new EPG is generated and transmitted to the television viewers every time a time scheduling modification is issued by the broadcaster. An example of an approach of this type is provided by Florical System, which, through its products named AirGuide and AirBoss, allow the broadcasters to distribute updated EPGs. Specifically, AirBoss is a play-to-air automation system that allows the broadcasters to perform a real time scheduling of content distribution; the AirGuide system is instead configured to read scheduling information to be exploited by the AirBoss system. All this real time data gathered by such systems is exploited to generate the EPG in a customizable fashion, which is then multiplexed in the broadcast stream. This system is currently used by some international broadcasters, such as ABC television.

According to a second known approach disclosed in the U.S. Pat. No. 6,571,053, each program is associated with a unique corresponding identification code; when a certain program starts, the broadcaster transmits the identification code associated with the program, in such a way to be automatically recognized by the PVR of the television viewer by performing an identification code matching. Unlike the previously described approach, which provides for continuously distributing data in order to update the EPG in real time, this solution provides for signaling the actual start of a given program. More specifically, each program is associated with a unique identification code; the time scheduling, together with the various identification codes, is distributed in advance by means of an EPG, or through other means, such as a TV guide provided by a newspaper or a magazine. When a television viewer yearns for recording a specific program through its PVR, he/she has to program the latter using the corresponding identification code taken from the EPG or the TV guide. Just before the actual start of a new program, the broadcaster sends the corresponding identification code to the PVR. As soon as the identification code sent by the broadcaster matches the identification code programmed into the PVR, the latter starts the recording; then, the recording is stopped when the PVR receives from the broadcaster the identification code of another, different program. Compared to the previously described system, this one requires less resources, but it is far less versatile and requires a deep user interaction.

The international patent application WO 2004/04360 discloses a synchronization system and method. The synchronization system comprises a specification unit for specifying synchronization signals associated with an audiovisual program, the latter comprising an audiovisual content and control information, a recognition unit for recognizing the synchronization signals in a transmitted stream carrying this program, by recognition of at least one extracted portion of the audiovisual content, and an activation unit triggering an action in case of detection of these signals. The specification unit prepares and transmits to the recognition unit recognition elements making it possible to obtain this extracted portion, as well as at least one action timeout lag in case of detection of the synchronization signals. The recognition or activation unit then delays the triggering of this action according to the lag transmitted, in case of detection of the synchronization signals. In variants, the timeout lag is determined and/or the recognition elements are obtained independently of the specification unit.

SUMMARY OF THE INVENTION

The Applicant has found that the abovementioned known approaches known in the art for increasing the reliability of EPGs are affected by a major drawback. Indeed, both of them require that substantially all the operations have to be carried out on the broadcaster side. Therefore, these solutions are neither reliable nor flexible. Moreover, said approaches require that the broadcasters have the will to provide television viewers with a reliable time scheduling, allowing them to identify in advance which portions of the audio and/or video contents transmitted correspond to commercials. However, many broadcasters prefer to avoid this capability, since the precise knowledge of commercials' occurrence would enable the television viewers to easily skip them.

Moreover, the Applicant has noticed that none of the approaches known in the art are capable of automatically and accurately identifying the actual start/end times of the broadcasted programs independently from the broadcaster itself.

According to an aspect of the present invention, there is provided a method for generating a time scheduling of a contents stream distributed to a plurality of terminals. The contents stream is segmented in consecutive segments, each segment defining a corresponding program. The method includes receiving auxiliary metadata comprising a planned time scheduling of the content stream which has been set in advance and monitoring at least a portion of a segment of the contents stream to extract corresponding content features therefrom. The method further includes generating a corresponding fingerprint based on the extracted content features. The method further includes assessing at least one among an actual start time and an actual end time of such segment based on a comparison between said fingerprint and a reference fingerprint associated with such segment, and updating the planned time scheduling based on the assessed at least one among the actual start time and the actual end time so as to generate a time scheduling synchronized with the contents stream.

According to an embodiment of the present invention, the method provides for partitioning each segment over time into a corresponding plurality of portions and generating said fingerprint based on content features extracted from a selected subset of portions among the corresponding plurality of portions.

Advantageously, the portions of said selected subset are localized in time adjacent to at least one among the start time and the end time of the corresponding segment.

According to a further embodiment of the present invention, said generating the fingerprint includes gathering a respective collection of content features for each portion of the selected subset.

Preferably, said comparison between said fingerprint and said reference fingerprint including calculating a distance between the content features of each collection and corresponding reference content features.

Said assessing at least one among an actual start time and an actual end time advantageously includes comparing said calculated distance with a predetermined threshold.

According to an embodiment of the present invention, said contents stream includes a video stream, and said content features of the corresponding segment includes at least one among: opening credits of the segment, a title sequence of the segment, a logo of the segment, closing credits of the segment, a duration of the portions of the segment, a visual codebook of the segment, activity levels of the segment, and text extracted from the segment.

If said content features of the corresponding segment include at least one among the opening credits and the closing credits of the segment, said assessing at least one among the actual start time and the actual end time of the segment may comprise comparing said at least one among the opening credits and the closing credits with text extracted from the received auxiliary metadata.

According to an embodiment of the present invention, said contents stream includes an audio stream, and said content features of the corresponding segment including at least one among: a duration of the portions of the segment, audio classes of the segment, and an average array of spectrogram's coefficients of the segment.

Preferably, said auxiliary metadata are arranged in the form of an electronic program guide.

Another aspect of the present invention provides for a communication network. The communication network includes a transmission center for the distribution of a contents stream segmented in consecutive segments and a time scheduling of the contents stream distribution to a plurality of terminals. Each segment defines a corresponding program. The communication network further comprises a unit for updating a planned time scheduling for generating the time scheduling synchronized with the contents stream distributed by the transmission center. Said unit for updating comprises a feature extractor for monitoring at least a portion of a segment of the contents stream to extract corresponding content features therefrom and a fingerprint generator for generating a corresponding fingerprint based on the extracted content features. The unit for updating further comprises a distance estimator for comparing said fingerprint with a reference fingerprint associated with such segment and an updater unit for assessing at least one among an actual start time and an actual end time of such segment based on said comparison, and updating the planned time scheduling based on the assessed at least one among the actual start time and the actual end time for generating the time scheduling synchronized with the contents stream.

According to an embodiment of the present invention said feature extractor, said fingerprint generator, said distance estimator, and said updater unit are included in the transmission center.

According to a further embodiment of the present invention, said feature extractor, said fingerprint generator, said distance estimator, and said updater unit are included in the terminals.

Preferably, the transmission center is a broadcasting center, and said terminals include at least one among set-top box systems, digital media receivers, media centers, decoders, personal video recorders, and personal computers.

A still further aspect of the present invention provides for a computer program configured to run on a processing unit of a communication network.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
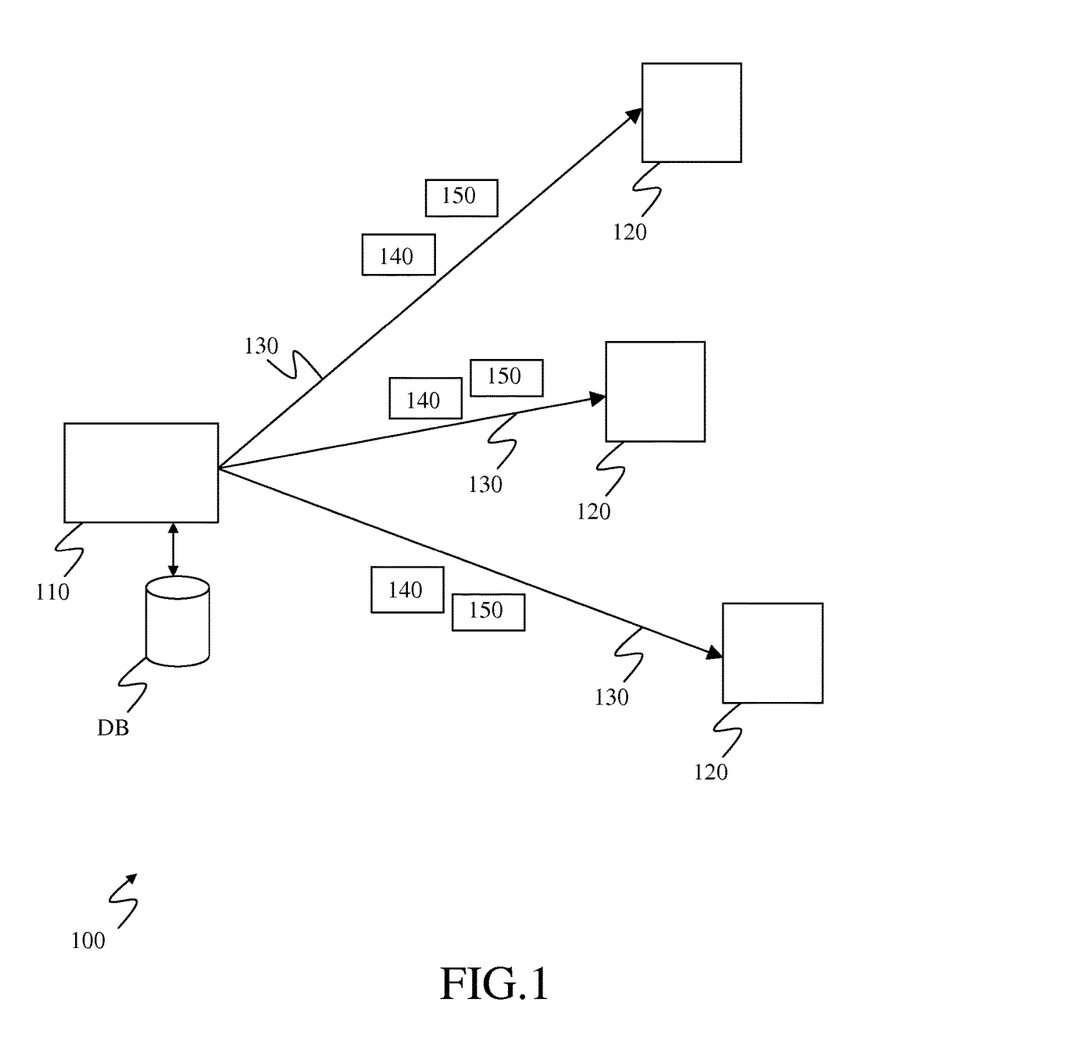
FIG. 1 schematically illustrates an exemplary communication network wherein the solution according to an embodiment of the present invention can be applied.

With reference to the drawings, FIG. 1 schematically illustrates an exemplary communication network 100 wherein the solution according to an embodiment of the present invention can be applied.

The communication network 100 comprises a broadcasting center 110 and a plurality of mass-market digital interactive terminals 120, such as set-top box systems, Digital Media Receivers (DMR), media centers, decoders integrated within modern flat-panel televisions, Personal Video Recorders (PVR), Personal Computers (PC) and the like. Each digital interactive terminal 120 is connected to the broadcasting center 110 by means of a corresponding communication link 130, such as an RF link, a cable link, a satellite link, an Internet link and the like.

The broadcasting center 110 is configured to distribute audio and/or video contents 140 (from now on, "AV contents" or simply "contents") to the interactive terminals 120 through the respective communication links 130. The broadcasting center 110 is further configured to transmit to the interactive terminals 120 auxiliary metadata about the distributed AV contents 140, comprising the time scheduling thereof as planned by the broadcaster; such auxiliary metadata are arranged in the form of an Electronic Program Guide (EPG), identified in the figures with the reference 150. For example, the distribution of both the AV contents 140 and the EPG 150 may be performed by the broadcasting center 110 with a broadcast transmission complying with the Digital Video Broadcasting (DVB) standards suite. The EPG 150 may be conveyed through the communication links 130 on the same communication channel wherein the AV contents 140 are conveyed, or alternatively it may be conveyed on a different, dedicated communication channel.

The EPG 150 is a collection of data that provides users of the interactive terminals 120 with information regarding the AV contents 140 transmitted by the broadcasting center 110; such data are read and interpreted by the interactive terminal 120 for the generation of an on-screen guide exploitable by the user of the interactive terminal 120 for navigating the time scheduling of the broadcast transmissions planned by the broadcasting center 110 in order to obtain information regarding the programs to be transmitted, such as their scheduled start/end times, the durations thereof, the channel on which they will be transmitted and so on.

Figure 2:
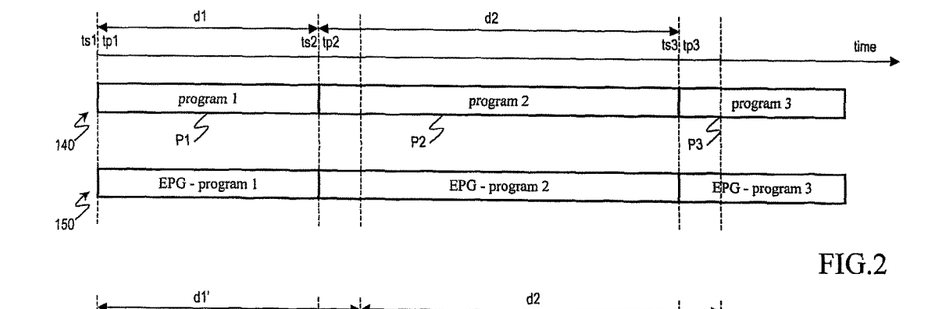
FIGS. 2 and 3 are exemplificative time diagrams showing how an EPG may be related to the AV contents stream transmitted by a broadcasting center of the communication network of FIG. 1.

Making now reference to FIG. 2, it is illustrated an exemplificative time diagram showing how the EPG 150 may be related to the AV contents 140. Particularly, the AV contents 140 are serially transmitted by the broadcasting center 110 in sequence over time, so as to form a so-called AV contents stream. The AV contents stream is segmented into a plurality of programs, such as television shows, films, episodes of a television series, news shows and the like; in the considered example, the media stream is segmented in three segments, each one defining a corresponding program Pi (i=1, 2, 3) beginning at a corresponding start time $ts_i$ and lasting a corresponding duration th. Specifically, the first program P1 begins at the start time $ts_1$ and lasts a duration $d_1$, the second program begins at the start time $ts_2=ts_1+d_1$ and lasts a duration $d_2$, and the third program begins at the start time $ts_3=ts_2+d_2$ and lasts a duration $d_3$. The start times and the durations of the various programs transmitted by the broadcasting center 110 are predetermined by the broadcaster according to a planned time scheduling which has been set in advance; said planned time scheduling is exploited for generating the EPG 150 as well. For example, the EPG 150 may be structured as a list that includes, for each program Pi of the media stream, a scheduled start time $tp_i$ specifying the presumed start time of the program Pi as provided by the time scheduling. Additionally, the EPG 150 may further provide for each program Pi the presumed duration thereof and/or a presumed time corresponding to the end thereof.

As illustrated in the example depicted in FIG. 2, if the programs Pi forming the media stream are transmitted by the broadcasting center 110 following the planned time scheduling in a very accurate way, their actual start times $ts_i$ coincide with the scheduled start times $tp_i$ provided by the EPG 150.

In this case, the users of the interactive terminals 120 are able to fully exploit the services offered by the EPG 150. For example, if an user of an interactive terminal 120 such as a PVR had previously planned the recording of a specific program Pi by setting a recording start time coinciding with the scheduled start time $tp_i$ provided by the EPG 150, the actual beginning of the program Pi will result to be correctly recorded. In case the interactive terminal 120 is instead a decoder integrated within or linked to a television set, it is possible to visualize in real time an on-screen guide—obtained from the EPG 150—which correctly identifies the program Pi that is actually broadcasted.

However, as previously mentioned, the updating of the EPG 150 is typically performed time to time, and not necessarily every time a new program Pi begins. Thus, because of possible sudden modifications in the broadcast transmission—such as the introduction of additional commercials, the unplanned increasing of a program duration, a sudden removal of a complete scheduled program and the like—the EPG 150 and the AV contents 140 stream may be desynchronized, resulting in a corresponding mismatch between the scheduled start times tpi provided by the EPG 150 and the actual start times tsi of the transmitted programs Pi.

Figure 3:
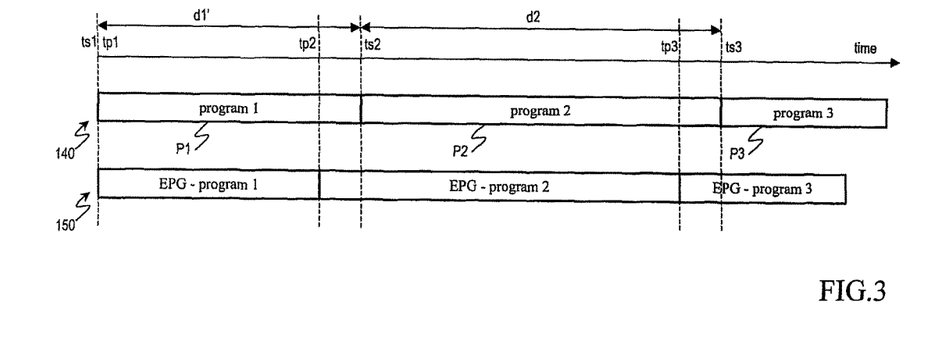

A situation of this type is shown in the exemplificative time diagram illustrated in FIG. 3, wherein the first program P1, even if was planned to last a duration d1, for some reason has a higher duration d1'. In this case, the subsequent program, i.e., the program P2, begins at a start time ts2 occurring later than the scheduled start time tp2. Thus, if an user of an interactive terminal 120 such as a PVR had previously planned the recording of the program P2 by setting a recording start time coinciding with the scheduled start time tp2 provided by the EPG 150 and a duration exactly equal to d2, the resulting recording will comprise a portion of the (undesired) preceding program, i.e., the program P1, and, more importantly, will not comprise the last portion of the desired program P2.

According to an embodiment of the present invention, the time scheduling provided by the EPG 150 is synchronized with the AV contents 140 stream actually transmitted by identifying the actual start time tsi of each program Pi through the extraction of audio-video features (hereinafter, referred to as "content features") from the AV contents 140 stream in a time window centered around the scheduled start time tpi provided by the EPG 150. The extracted content features are used for generating a corresponding "program fingerprint" F(Pi), which is then compared with a collection of reference fingerprints RF(Pi) previously stored in a database. Each reference fingerprint is associated with a specific program Pi; if the program fingerprint F(Pi) generated from the extracted content features matches one of the reference fingerprints RF(Pi) stored in the database, it means that the program that is actually transmitted it is the one associated with such reference program fingerprint RF(Pi).

The solution according to an embodiment of the present invention is based on the idea that from the AV contents 140 stream corresponding to a specific program Pi it is nearly always possible to extract content features that are consistent both over time—i.e., that can be retrieved every time such program Pi is retransmitted—and over the media formats—i.e., that can be retrieved even if the program Pi is transmitted with a different resolution, aspect ratio, compression, quality, and so on—which allow to specifically identify the start time tsi (and the end time as well) of such program Pi.

It has to be underlined that for some types of programs Pi (e.g., movies) the content features that are consistent over time may last for the whole duration di of the programs Pi. Conversely, for some types of programs Pi (such as television shows or episodes of a television series) the content features that are consistent over time may correspond only to the beginning and ending portions of the programs Pi. Indeed, every time a movie is retransmitted, the AV contents 140 stream is always substantially the same; conversely, every time a television show or a different episode of a same television series are transmitted, the only portions of the AV content 140 stream that are unchanged may correspond for example to the title sequence at the start and the title sequence at the end.

In the following of the present description possible content features will be presented that can be extracted from the AV contents 140 stream for allowing the identification of the start time or the end time of a program Pi according to an embodiment of the present invention.

Figure 4:
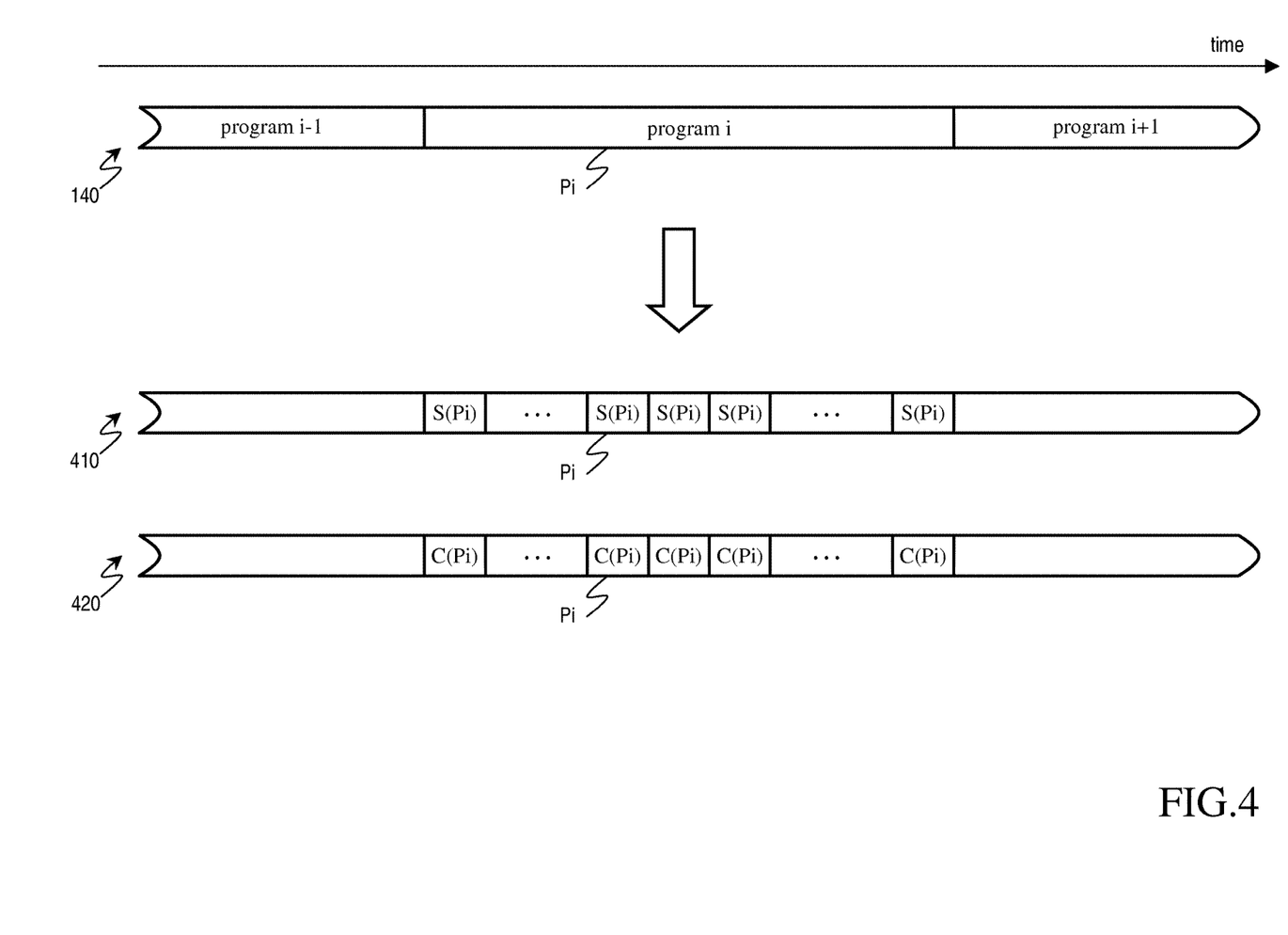
FIG. 4 illustrates how the AV contents stream transmitted by a broadcasting center of the communication network of FIG. 1 can be subdivided into a video stream for the video contents and an audio stream for the audio contents.

Making reference to FIG. 4, the AV contents 140 stream can be generally subdivided into two main sub-streams, namely a video stream 410 for the video contents and an audio stream 420 for the audio contents.

The video stream 410 corresponding to a generic program Pi may be partitioned over time into a plurality of video portions, referred to as "shots" and identified in the figure with the reference S(Pi). Each shot S(Pi) corresponds to a continuous video filming obtained from a single camera take. Shots are generally filmed with a single camera and can be of any duration.

Similarly, the audio stream 420 corresponding to a generic program Pi may be partitioned over time into a plurality of audio portions, referred to as "clips" and identified in the figure with the reference C(Pi). Each clip C(Pi) is a portion of audio recording having homogeneous characteristics. For example, a clip C(Pi) may include only speech, silence, environmental sounds or music.

From each single shot S(Pi) it is possible to extract different video features, each one characterizing the video content of the shot under a respective different point of view. Generally speaking, all the video features that characterize the video content of a shot may be of the extrinsic type or of the intrinsic type. Specifically, with the term of intrinsic video feature it is intended any video feature concerning the video itself as filmed through the camera, while with the term of extrinsic video feature it is intended any video feature concerning elements that have been superimposed on the video filmed by the camera, such as text and logos.

A very important extrinsic video feature that can be extracted from a shot S(Pi) of a program Pi is given by the opening credits. As it is well known, the opening credits list the most important members of the production, the crew, the director, the major actors, and so on. They are usually shown as still or scrolling text that is typically superimposed on a blank screen or on static pictures. The text may be extracted from the shot through specific text-recognition algorithms. Since the opening credits of a program Pi typically occur at the very beginning thereof (or at most after a cold-open scene), it is very probable that such video feature is present in at least one of the very first shots S(Pi) of each program Pi.

Another video feature of the extrinsic type that can be extracted from a shot S(Pi) of a program Pi is provided by the title sequence. With title sequence it is intended the method by which cinematic films or television shows present their title, cast and/or members of the production using conceptual visuals. It has to be appreciated that the concept of title sequence is very different than the concept of opening credits, the latter being the simple superimposition of text over a static pictures. Even in this case, the title sequence of a program Pi typically occurs at the very beginning thereof (or after a cold-open scene), and thus it is very probable that such feature is comprised in at least one of the first shots S(Pi) of each program Pi.

A further extrinsic video feature may regard the presence or not of logos superimposed on the video filmed by the camera. If the presence thereof occurs only during the opening of a program Pi—and, thus, only during its first shot(s) S(Pi)—the logo is called "opening logo"; if the presence thereof occurs during the ending of a program,— and, thus, only during its last shot(s) S(Pi)—the logo is called "closing logo"; if instead the presence thereof occurs during the whole duration of the program Pi, the logo is called "show logo".

A still further extrinsic video feature that can be extracted from a shot S(Pi) of a program Pi is given by the closing credits. The closing credits are similar to the opening credits, but they are typically displayed on the screen using small characters, which either flip very quickly from page to page, or move from bottom to top of the screen ("rolling credits"). Since the closing credits of a program Pi typically occur at the very end thereof, it is very probable that such video feature is present in at least one of the very last shots S(Pi) of each program Pi.

A simple intrinsic video feature that can be extracted from a shot S(Pi) of a program Pi is the duration of the shot S(Pi) itself.

A very important intrinsic video feature that allows to efficiently characterize the visual content of a shot S(Pi) is the visual codebook obtainable through the employ of a vector quantization algorithm, such as the Lloyd-Max algorithm, on the video stream 410 portion corresponding to the shot S(Pi) itself. The visual codebook can be constituted by the set of rectangular blocks that can be used to approximate at best the frames forming the considered shot S(Pi).

A further intrinsic video feature that can be extracted from a shot S(Pi) relates to the motion of the filmed scene. The considered shot S(Pi) is characterized by the activity level (movement) of the filmed scene corresponding to the shot. Particularly, it is possible to extract compact characteristics reassuming the movement perception level of a video scene.

Referring now to the audio stream 420, from each single clip C(Pi) as well it is possible to extract different audio features, each one characterizing the audio content of the clip under a respective different point of view.

A first type of audio feature that can be extracted from a clip C(Pi) of a program Pi is the duration of the clip C(Pi) itself.

A further audio feature may regard the classification of the clip C(Pi) under one among different audio classes, such as—only for mentioning some—one of speech, silence, music or environmental sounds audio classes.

Within each audio class, the clip C(Pi) may be further characterized by other audio features capable of reassuming the audio content, such as the average array of the spectrogram's coefficients associated with the clip, and the ZCR (Zero Crossing Rate).

As previously anticipated, according to an embodiment of the present invention the actual start time tsi of a generic program Pi transmitted by the broadcasting center 110 is retrieved by exploiting a corresponding fingerprint F(Pi) generated from video and audio features of selected shots S(Pi) and clips C(Pi) of the corresponding video and audio streams, respectively.

Particularly, according to an embodiment of the present invention the fingerprint F(Pi) associated with a generic program Pi is a data array defined as:

$$F(Pi)=\{VS(i)1, \ldots, VS(i)x, \ldots, VS(i)m; AC(i)1, \ldots, AC(i)y, \ldots, AC(i)n\},$$

wherein VS(i)x is a collection of video features of the x-th shot S(Pi) of the program Pi, and AC(i)y is a collection of audio features of the y-th clip C(Pi) of the program Pi, i.e.:

$$VS(i)x=\{VF(i)x1, VF(i)x2, \ldots\}$$

$$AC(i)y=\{AC(i)y1, AC(i)y2, \ldots\},$$

wherein VF(i)x1 is a first video feature (e.g., the visual codebook) of the x-th shot S(Pi), VF(i)x2 is a second video feature (e.g., the activity level of the filmed scene) of the x-th shot S(Pi), AC(i)y1 is a first audio feature (e.g., the average array of the spectrogram's coefficients associated with the clip) of the y-th clip C(Pi), and AC(i)y2 is a second audio feature (e.g., the ZCR) of the y-th clip C(Pi).

According to an embodiment of the present invention, in order to be capable of efficiently identifying a program Pi, the corresponding fingerprint F(Pi) is generated by taking into consideration only a selected subset of shots S(Pi) and clips C(Pi) among the totality thereof forming the whole program Pi, and particularly those corresponding to video and audio features that are consistent over time, i.e., that remain substantially unchanged every time the program Pi is retransmitted. As previously mentioned, the shots S(Pi) and the clips C(Pi) of a program Pi that are characterized by video and audio features consistent over time are the ones corresponding to, or adjacent to, the beginning and to the end of the program Pi itself, such as the ones corresponding to the opening credits and to the closing credits, respectively. In view of the above, according to an embodiment of the present invention, each fingerprint F(Pi) associated to a program Pi may be subdivided into two parts, and specifically a first one regarding the shots S(Pi) and the clips C(Pi) corresponding to the beginning of the program itself, and a second one regarding the shots S(Pi) and the clips C(Pi) corresponding to the end of the program itself.

Having introduced the concept of program fingerprint, reference is now made back to FIG. 1, wherein, according to an embodiment of the present invention, the broadcasting center 110 is coupled with a database DB adapted to store the fingerprints of the various programs Pi to be transmitted, referred to as reference fingerprints RF(Pi). These reference fingerprints RF(Pi) may be generated by an operator of the broadcasting center 110, or by an external entity, in the same way as previously described for the program fingerprints F(Pi). Alternatively, the reference fingerprints RF(Pi) may be generated within the interactive terminal 120. Moreover, in the same way as the program fingerprints F(Pi), each reference fingerprint RF(Pi) may be subdivided into two parts as well, namely a first part corresponding to the beginning of the program and a second part corresponding to the end of the program.

Figure 5:
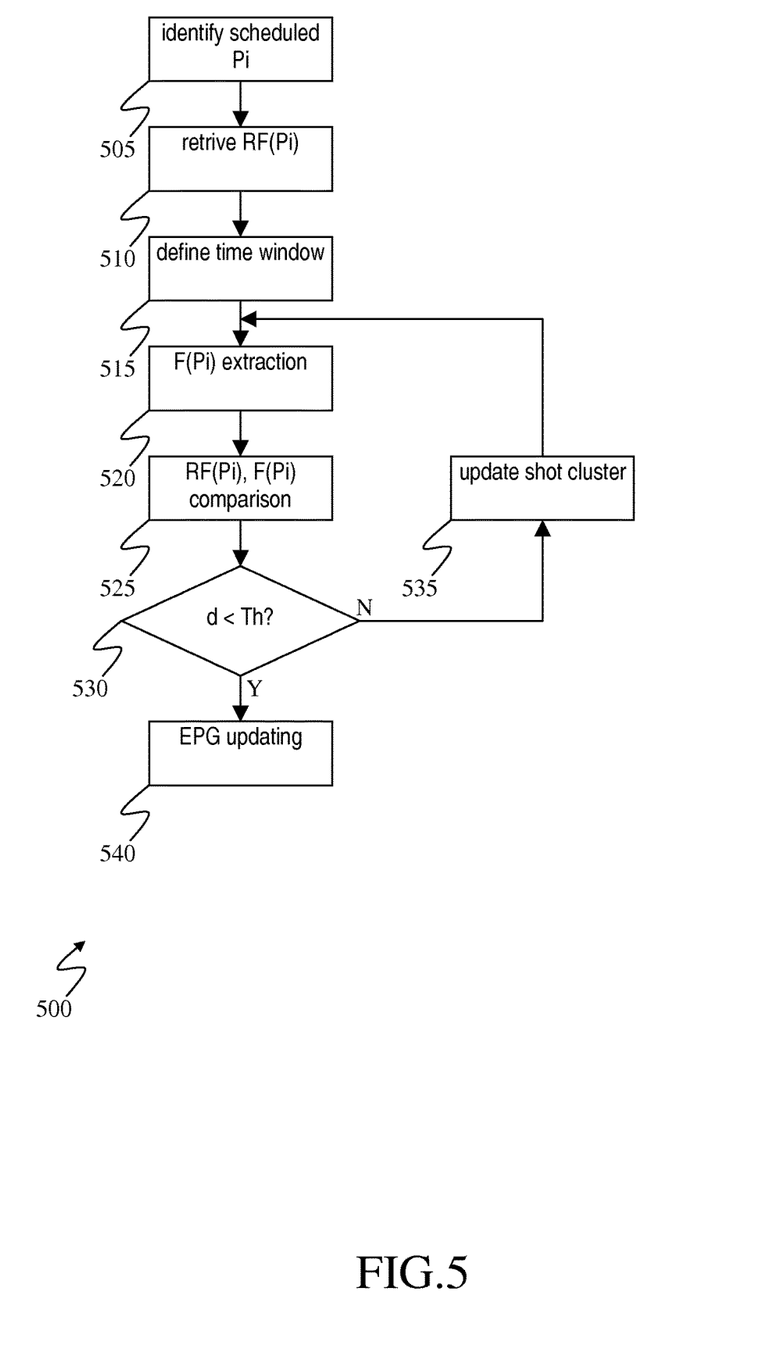
FIG. 5 is a flowchart illustrating the main steps of a method for synchronizing the EPG with the AV contents stream actually transmitted by the broadcasting center of the communication network of FIG. 1 according to an embodiment of the present invention.

FIG. 5 is a flowchart 500 illustrating the main steps of a method for synchronizing the EPG 150 with the AV contents 140 stream actually transmitted by the broadcasting center 110 according to an embodiment of the present invention. The main steps of the method illustrated in FIG. 5 will be now described making reference in particular to the exemplary situation depicted in FIGS. 6A-6E, wherein a generic i-th program Pi begins at a start time tsi occurring later than the corresponding scheduled start time tpi provided by the EPG 150. It has to be appreciated that, for the sake of simplicity, in the exemplary case illustrated in FIGS. 6A-6E, the AV contents 140 stream is formed by the video stream 410 only; however, similar consideration apply if the AV contents 140 stream further comprises an audio stream 420. In the example at issue, the last three shots of the program Pi−1 are identified with the references $S(Pi-1)_1$, $S(Pi-1)_2$, $S(Pi-1)_3$, respectively, while the first three shots of the program Pi are identified with the references $S(Pi)_1$, $S(Pi)_2$, $S(Pi)_3$, respectively.

Assuming that the program that is currently transmitted is the program Pi−1, the first step of the method provides for identifying from the EPG 150 which is the next program Pi to be transmitted (block 505).

Once said program Pi has been identified, the corresponding reference fingerprint RF(Pi) is retrieved from the database DB (block 510). For example, the reference fingerprint RF(Pi) that identifies the beginning of the program Pi may be:

$$RF(Pi)=\{VS(i)1, VS(i)2\},$$

wherein VS(i)1 is a collection of video features of the first shot $S(Pi)_1$ of the program Pi and VS(i)2 is a collection of video features of the second shot $S(Pi)_2$ of the program Pi.

A search time window is then generated, centered around the scheduled start time tpi of the program Pi provided by the EPG 150 (block 515); the duration of the time interval defined by the search time window is set based on a maximum allowable time delay and a maximum allowable time advance depending on the type of program Pi and the considered viewing time. If correctly set, the time interval defined by the search time window starts at a time tw1 for which the video stream 410 actually corresponds to the program Pi−1 and ends at a time tw2 for which the video stream 410 corresponds to the program Pi.

Figure 6A:
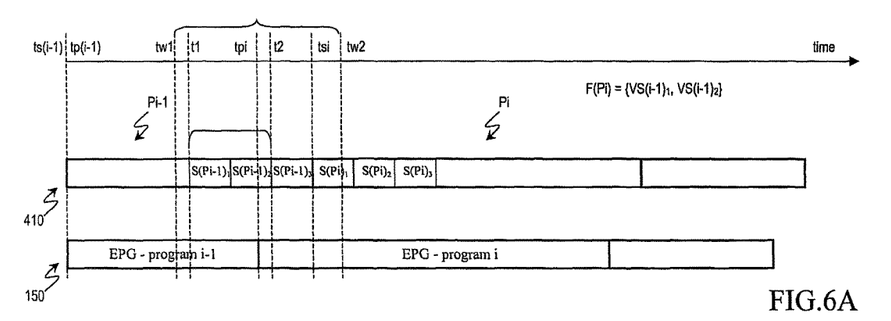
FIGS. 6A-6E are time diagrams of an exemplificative EPG and an exemplificative video stream during steps of the method illustrated in FIG. 5.

Once the current time reaches the time tw1 corresponding to the beginning of the search time window, the video stream 140 is monitored for extracting a program fingerprint F(Pi) therefrom. According to an embodiment of the present invention, operations are performed for extracting from the video stream 410 a program fingerprint F(Pi) having a "length" that is compatible with that of the reference fingerprint RF(Pi) (block 520). More specifically, the program fingerprint F(Pi) has to be extracted from a shot cluster formed by a number of consecutive shots of the video stream 410 that is equal to the number of shots corresponding to the reference fingerprint RF(Pi). In the considered example, the reference fingerprint RF(Pi) is generated through the extraction of video features from the first two shots $S(Pi)_1$, $S(Pi)_2$ of the program Pi; thus, in this exemplary case, the program fingerprint F(Pi) should be extracted from a shot cluster of the video stream 410 that is formed by two shots. As a consequence, according to an embodiment of the present invention, once the time tw1 is elapsed, the extraction of video features is initiated as soon as the beginning of a new shot is identified in the video stream 410—in the example at issue, the shot $S(Pi-1)_1$ of the program Pi−1, which begins at the time t1. When the last shot of the shot cluster is terminated—in the example at issue, at the time t2 corresponding to the end of the shot $S(Pi-1)_2$ of the program Pi−1-, the video features extracted from these shots are gathered to generate a corresponding program fingerprint F(Pi). In the situation illustrated in FIG. 6A, the extracted program fingerprint F(Pi) corresponds to the shots $S(Pi-1)_1$ and $S(Pi-1)_2$ of the program Pi−1, and thus is equal to:

$$F(Pi)=\{VS(i-1)1, VS(i-1)2\},$$

wherein VS(i−1)1 is a collection of video features of the shot $S(Pi-1)_1$ and VS(i−1)2 is a collection of video features of the shot $S(Pi-1)_2$.

A comparison is then made between the program fingerprint F(Pi) just extracted from the video stream 410 and the reference fingerprint RF(Pi) (block 525). Particularly, according to an embodiment of the present invention, this operation is performed by calculating the distance between the various collections of video features forming the two fingerprints. In the exemplary situation depicted in FIG. 6A, the comparison is made between the collection VS(i−1)1 (first element of the program fingerprint F(Pi)) and the collection VS(i)1 (first element of the reference fingerprint RF(Pi)), and between the collection VS(i−1)2 (second element of the program fingerprint F(Pi)) and the collection VS(i)2 (second element of the reference fingerprint RF(Pi)).

For example, the distance between two video features relating to the visual codebook may be calculated with the so-called Earth Mover Distance (EMD) disclosed in "A Metric for Distributions with Applications to Image Databases" by Y. Rubner, C. Tomasi, L. J. Guibas, *Proceedings of the* 1998 *IEEE International Conference on Computer Vision*, Bombay, India, Jan. 1998, pages 59-66. Specifically, the EMD may be used by employing the Euclidean distance as a dissimilarity measure between the single codewords.

The distance between any pair of video features relating to the activity level of the segment, such as the motion activity map disclosed in "Using lateral ranking for motion-based video shot retrieval and dynamic content characterization" by S. Benini, L.-Q. Xu, R. Leonardi, *Proceedings of CBMI'05*, Riga, Latvia, Jun. 21-23, 2005, may be determined using the Manhattan norm (the L1 distance), since the definition itself of such types of video features involves the modulus operation.

A possible way to determine the distance between two textual video features may provide for the use of the so-called Levenshtein distance disclosed in "Binary codes capable of correcting deletions, insertions, and reversals" by Levenshtein V. I., 1996, *Soviet Physics Doklady* 10: 707-10.

If the average distance d between each pair of corresponding collections of video features is higher than a predetermined threshold th (exit branch "N" of block 530), it means that the beginning of the program Pi has not been yet transmitted. This is the case of the situation illustrated in FIG. 6A, wherein the collections of video features greatly differs one to each other, since the extracted fingerprint F(Pi) corresponds to the third last and second last shots $S(Pi-1)_1$, $S(Pi-1)_2$ of the program Pi−1, and not to the first and second shots $S(Pi)_1$, $S(Pi)_2$ of the desired program Pi.

In this case, a new program fingerprint extraction is performed on a new shot cluster of the video stream 410 (block 535). Particularly, according to an embodiment of the present invention, such new shot cluster is obtained by discharging the oldest shot among those forming the shot cluster previously employed, and by including the next shot occurring after the latest shot of the shot cluster previously employed. In the situation illustrated in FIG. 6B, the shot $S(Pi-1)_1$ is discharged from the shot cluster, while the shot $S(Pi-1)_3$ is added thereto.

At this point, the operations previously described for extracting the program fingerprint F(Pi) are performed on the new shot cluster (return to block 520). The new program fingerprint F(Pi) is then compared with the reference fingerprint RF(Pi).

Figure 6B:
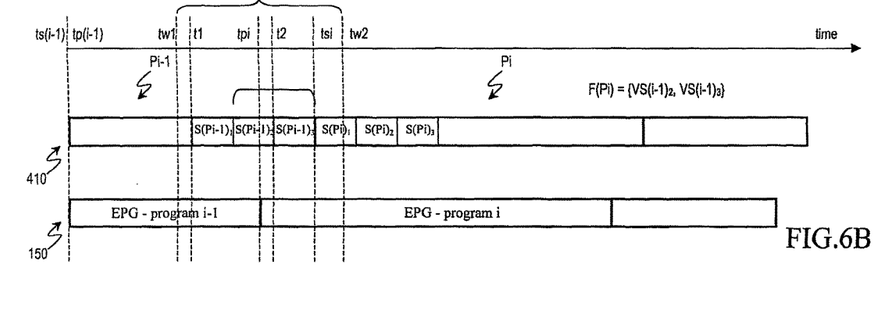
Figure 6C:
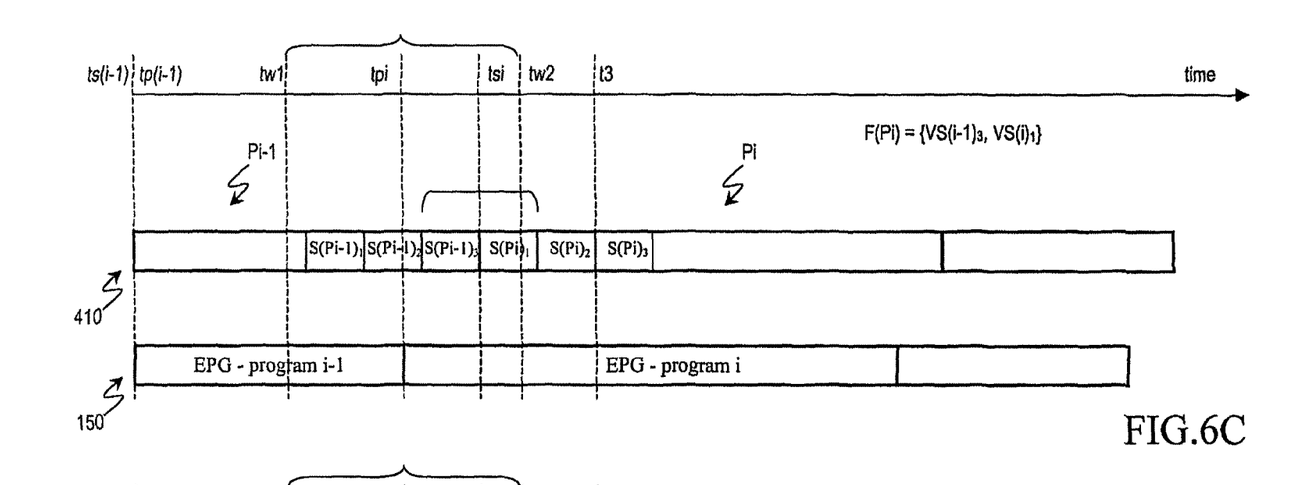
Figure 6D:
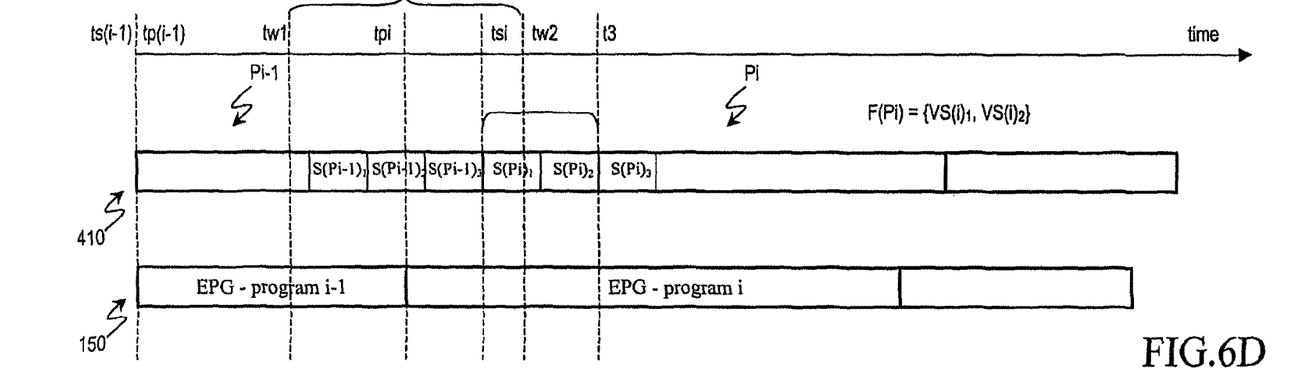

The method is then reiterated until the average distance d between each pair of corresponding collections of video features in the extracted program fingerprint F(Pi) and in the reference fingerprint RF(Pi) is lower than the threshold th. In the example at issue, this occurs after three reiterations. Particularly:

after the first reiteration, the extracted program fingerprint is equal to F(Pi)={VS(i−1)2, VS(i−1)3}, i.e., the extracted program fingerprint corresponds to the second last and last shots $S(Pi-1)_2$, $S(Pi-1)_3$ of the program Pi−1 (FIG. 6B);

after the second reiteration, the extracted program fingerprint is equal to F(Pi)={VS(i−1)3, VS(i)1}, i.e., the extracted program fingerprint corresponds to the last shot $S(Pi-1)_3$ of the program Pi−1 and to the first shot $S(Pi)_1$ of the program Pi (FIG. 6C), and after the third reiteration, the extracted program fingerprint is equal to F(Pi)={VS(i)1, VS(i)2}, i.e., the extracted program fingerprint corresponds to the first and second shots $S(Pi)_1$, $S(Pi)_2$ of the program Pi (FIG. 6D).

If the average distance d between each pair of corresponding collections of video features in the extracted program fingerprint F(Pi) and in the reference fingerprint RF(Pi) is lower than the threshold th (exit branch "Y" of block 530), it means that the program Pi is actually begun. In the example at issue, this happens when the extracted fingerprint corresponds to the first and second shots $S(Pi)_1$, $S(Pi)_2$ of the program Pi, i.e. when F(Pi)={VS(i)1, VS(i)2}. It has to be appreciated that the threshold di is always set higher than zero, since it is quite impossible that the video features of a program remain exactly the same every time the same program Pi is retransmitted. For example, the duration of the first shots may be slightly modified, the transmission may be performed using a different video compression, and so on. For this reason, according to an embodiment of the present invention the comparison operations are repeated for a plurality of occurrences of the same program Pi so as to determine a corresponding set of distances. Then, assuming that the distances calculated in this way are distributed according to a gaussian distribution, the effective threshold th is set to the average value plus, e.g., the standard variation of such distribution.

Figure 6E:
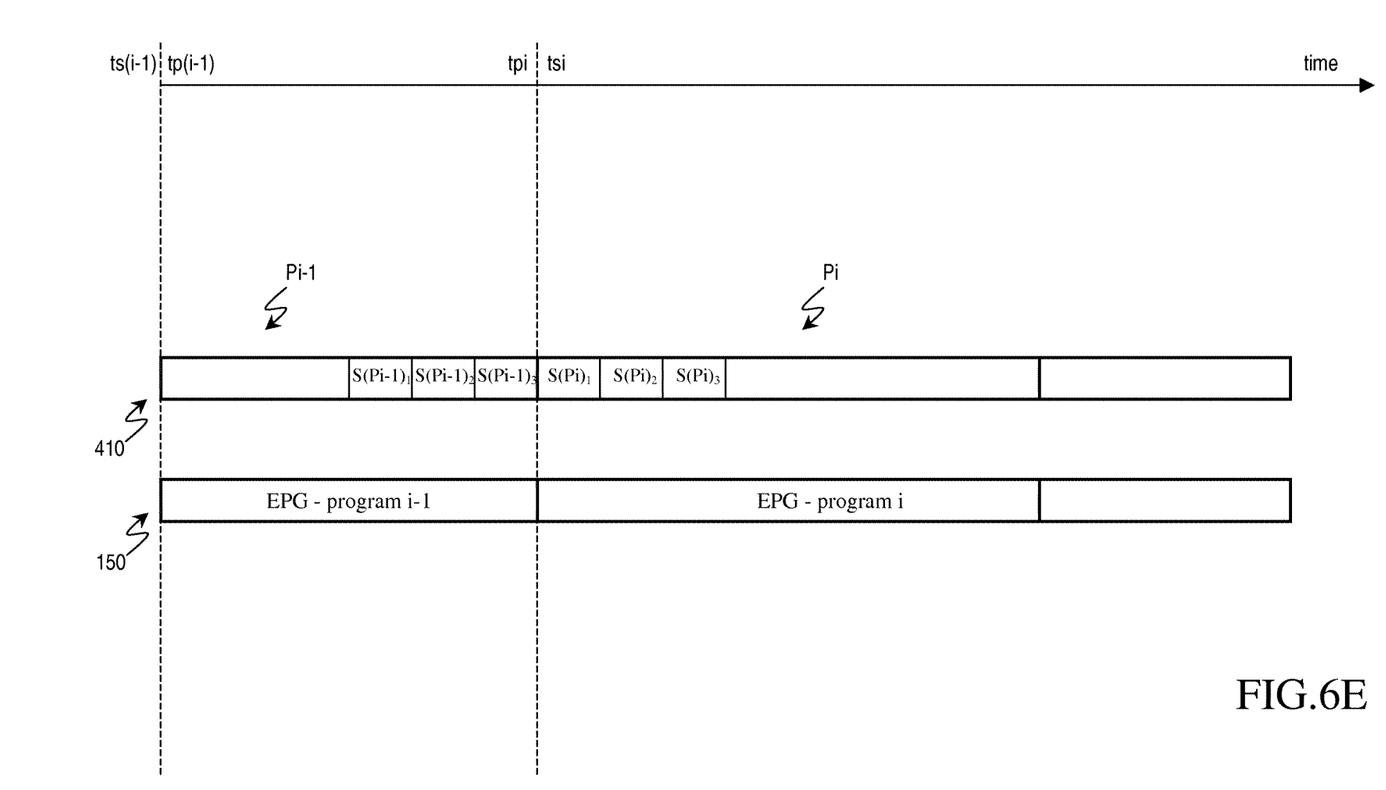

At this point, the time scheduling provided by the EPG 150 is accordingly updated (block 540), by setting the scheduled start time tpi to a value equal to the end time of the last shot used for extracting the fingerprint F(Pi) (in the considered example, the time t3 corresponding to the end of the shot $S(Pi)_2$) minus the entire duration of all the shots corresponding to the last extracted fingerprint F(Pi) (in the considered example, the duration of the shot $S(Pi)_1$ plus the duration of the shot $S(Pi)_2$). This situation is illustrated in FIG. 6E.

It has to be underlined that in the example at issue, the EPG 150 is synchronized with the AV contents 140 stream actually transmitted through the identification of the beginning of the program Pi by exploiting a reference fingerprint RF(Pi) relating to the beginning of the program Pi. Similar considerations apply in case the EPG 150 is synchronized through the identification of the end of the previous program Pi−1 by exploiting a reference fingerprint RF(Pi−1) relating to the end of the program Pi−1.

In order to increase the robustness of the operations, according to a further embodiment of the present invention the EPG synchronization is carried out by identifying at the same time both the beginning of the program Pi and the end of the previous program Pi−1.

According to another embodiment of the present invention, if the extracted program fingerprint comprises video features concerning text, such as the opening credits and/or the closing credits, the efficiency of the previously described EPG synchronization method can be further improved by advantageously exploiting additional data retrievable from the EPG itself More specifically, the auxiliary metadata forming the EPG may further include brief text information relating to the program to be broadcasted, such as the title, the director and the actors of a film, and since the same information is usually disclosed in the opening and/or closing credits as well, by performing a comparison between the text of the EPG and such video feature of the program fingerprint it is possible to increase the efficiency of the synchronization method. For example, said additional comparison may be carried out after having performed the comparison between the extracted program fingerprint and the reference fingerprint.

As already pointed out, the method previously described can be applied to AV contents 140 streams further comprising an audio stream 420, or even comprising an audio stream 420 only instead of the video stream 410. In this case, the operations previously described are performed on clips of the stream, so as to compare the audio features thereof.

The steps of the method herein illustrated according to an embodiment of the present invention can be directly performed by the broadcasting center 110. Once the EPG 150 has been correctly updated, it is transmitted toward the interactive terminals 120 of the communication network 100.

Figure 7:
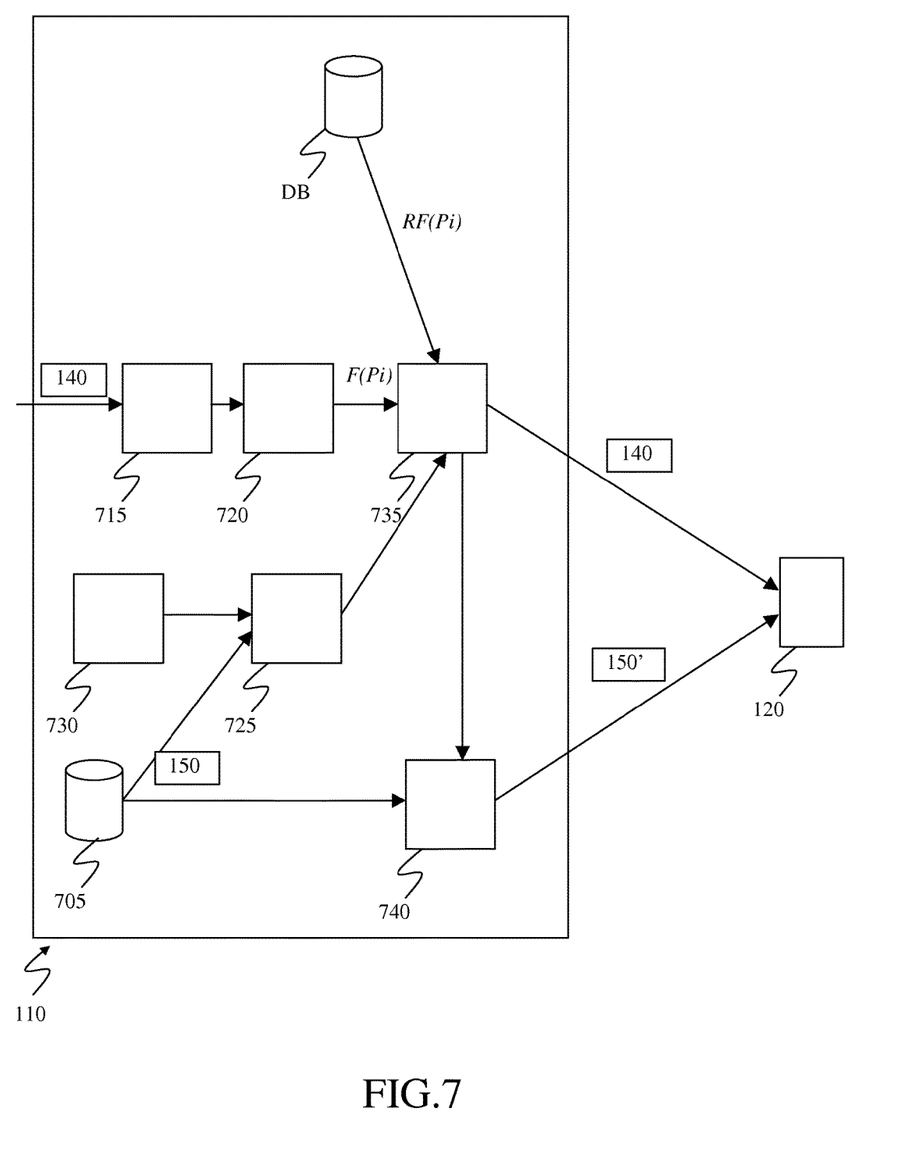
FIG. 7 is a schematic block diagram illustrating a way to implement the method corresponding to the flow chart of FIG. 5 according to a first embodiment of the present invention.

A possible way to implement this solution according to an embodiment of the present invention is illustrated in the schematic block diagram of FIG. 7.

Specifically, according to said embodiment, the broadcasting center 110 comprises an EPG database, identified with the reference 705, which is adapted to store the EPG 150 to be distributed toward the interactive terminals 120, and the database DB, which is adapted to store the reference fingerprints RF(Pi). A feature extractor block 715 is configured to receive the AV contents 140 to be transmitted and extract corresponding video and/or audio features therefrom. The extracted video and/or audio features are then provided to a fingerprint generator block 720, which is configured to generate a corresponding program fingerprint F(Pi). The broadcasting center 110 further includes a search time window generator unit 725, which is configured to receive a timing signal generated by a clock generator block 730 and the EPG 150 (to be synchronized) stored in the first database 705 so as to determine the program index i of the reference program and accordingly generate the search time window to be used during the synchronization operations. A distance estimator unit 735 is configured to compare the reference fingerprint RF(Pi) retrieved from the database DB with the extracted program fingerprint F(Pi) generated by the fingerprint generator block 720 using the time window and the program index i generated by the search time window generator unit 725. In case the average distance between the compared fingerprints is lower than the predetermined threshold, an EPG updater unit 740 accordingly updates the EPG 150, thus generating a corresponding EPG 150' that is actually synchronized to the AV contents 140. The synchronized EPG 150' is then transmitted to the various interactive terminals 120 together with the AV contents 140.

Alternatively, the EPG synchronization operations may be performed locally by the interactive terminals 120 themselves, provided that the latter are provided with a sufficient processing capability. In this case, in order to retrieve the reference fingerprints RF(Pi) to be used for the comparison, the interactive terminals 120 have to be capable of retrieving data from the database DB coupled with the broadcasting center 110.

Figure 8:
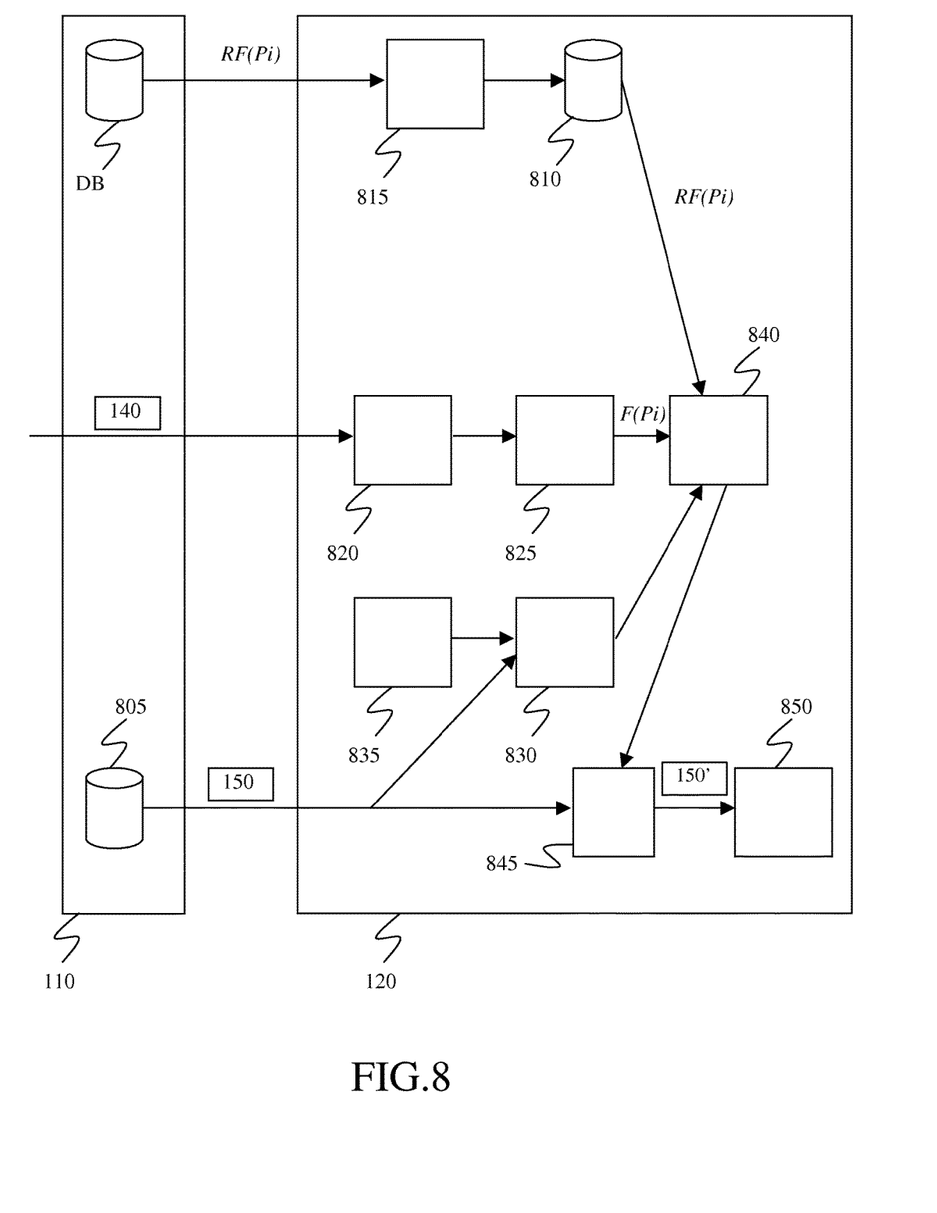
FIG. 8 is a schematic block diagram illustrating a way to implement the method corresponding to the flow chart of FIG. 5 according to a second embodiment of the present invention.

A possible way to implement this solution according to an embodiment of the present invention is illustrated in the schematic block diagram of FIG. 8.

In the same way as for the embodiment illustrated in FIG. 7, the broadcasting center 110 is provided with an EPG database 805 storing the EPG 150 to be distributed toward the interactive terminals 120, and the database DB storing the reference fingerprints RF(Pi). However, since in the embodiment of the invention illustrated in FIG. 8 the synchronization operations are locally carried out by the interactive terminals 120, copies of the reference fingerprints RF(Pi) that are stored in the database DB should be stored in the interactive terminals 120 as well. For this purpose, the interactive terminals 120 are provided with a respective local database 810 and a reference fingerprint updater unit 815; the reference fingerprint unit 815 is configured to receive from the broadcasting center 110 the reference fingerprints RF(Pi) stored in its database DB, and accordingly store them in the local database 810. Alternatively, according to a further embodiment not shown in FIG. 8, the interactive terminals 120 may generate internally the reference fingerprints RF(Pi), analyzing AV contents received in the past and using the same techniques as previously described for the program fingerprints F(Pi), and store such reference fingerprints in the local database 810. The interactive terminals 120 comprise a feature extractor block 820 which is configured to receive the AV contents 140 transmitted by the broadcasting center 110 and extract corresponding video and/or audio features therefrom. The extracted video and/or audio features are then provided to a fingerprint generator block 825, which is configured to generate a corresponding program fingerprint F(Pi). The interactive terminals 120 further include a search time window generator unit 830, which is configured to receive a timing signal generated by a clock generator block 835 and the EPG 150 (to be synchronized) transmitted by the broadcasting center 110 so as to determine the program index i of the reference program and accordingly to generate the search time window to be used during the synchronization operations. A distance estimator unit 840 is configured to compare the reference fingerprint RF(Pi) retrieved from the local database 810 with the extracted program fingerprint F(Pi) generated by the fingerprint generator block 825 using the time window and the program index i generated by the search time window generator unit 830. In case the average distance between the compared fingerprints is lower than the predetermined threshold, an EPG updater unit 845 accordingly updates the EPG 150, thus generating a corresponding EPG 150' that is actually synchronized to the received AV contents 140. The synchronized EPG 150' is then provided to the various applications of the interactive terminals 120 exploiting the EPG (such as the recording application), globally identified in FIG. 8 with the block 850.

Both the implementations illustrated in FIGS. 7 and 8 provide for the combined operation of several circuit blocks/units. According to an embodiment of the present invention, one or more of said circuit blocks/units are configured to perform portions of the method herein illustrated by executing respective instructions of a dedicated routine, for example belonging to a computer program stored in respective memory units in form of software and/or firmware. Moreover, according to an embodiment of the present invention, one or more (or even all) of these circuit blocks/unit may be entirely replaced by corresponding software/firmware units running on corresponding processing units.

The previous description presents and discusses in detail several embodiments of the present invention; nevertheless, several changes to the described embodiments, as well as different invention embodiments are possible, without departing from the scope defined by the appended claims.

For example, although the present description has been made to a communication network in which the distribution of AV contents is performed through a broadcast transmission carried out by a broadcasting center, the concepts of the present invention can be applied to different types of transmissions, such as to a transmission of the multicast type.

The invention claimed is:

1. A method for generating a time scheduling of a contents stream distributed to a plurality of terminals, the contents stream being segmented in consecutive segments, each segment defining a corresponding program, the method including:
   receiving auxiliary metadata comprising a planned time scheduling of the content stream which has been set in advance;
   partitioning each segment over time into a corresponding plurality of portions in accordance with video characteristics of said each segment;
   monitoring at least a selected subset of portions among the corresponding plurality of portions to extract corresponding video content features from the selected subset;
   generating a corresponding fingerprint based on the extracted video content features, the fingerprint including a set of the extracted video content features, wherein said generating the fingerprint includes gathering a respective collection of the video content features for each portion of the selected subset;
   assessing at least one among an actual start time and an actual end time of such segment based on a comparison between said fingerprint and a reference fingerprint associated with such segment and having a plurality of corresponding reference content features, said comparison between said fingerprint and said reference fingerprint including calculating a distance between each of the video content features and a corresponding one of the corresponding reference content features and calculating an average distance from the calculated distances, and wherein said assessing at least one among an actual start time and an actual end time includes comparing said average distance with a predetermined threshold; and
   updating the planned time scheduling based on the assessed at least one among the actual start time and the actual end time so as to generate a time scheduling synchronized with the contents stream.

2. The method of claim 1, wherein the portions of said selected subset are localized in time adjacent to at least one among the start time and the end time of the corresponding segment.

3. The method of claim 1, wherein said contents stream includes a video stream, said content features of the corresponding segment including at least one among:
   opening credits of the segment;
   a title sequence of the segment;
   a logo of the segment;
   closing credits of the segment;
   a duration of the portions of the segment;
   a visual codebook of the segment;
   activity levels of the segment, and
   text extracted from the segment.

4. The method of claim 3, wherein said content features of the corresponding segment include at least one among the opening credits and the closing credits of the segment, and said assessing at least one among the actual start time and the actual end time of the segment comprises comparing said at least one among the opening credits and the closing credits with text extracted from the received auxiliary metadata.

5. The method of claim 1, wherein said contents stream includes an audio stream, said content features of the corresponding segment including at least one among:
   a duration of the portions of the segment;

audio classes of the segment, and an average array of spectrogram's coefficients of the segment.

6. The method of claim 1, wherein said auxiliary metadata are arranged in the form of an electronic program guide.

7. A communication network including:
a transmission center for the distribution of
a contents stream segmented in consecutive segments, each segment defining
a corresponding program, and
a time scheduling of the contents stream distribution to a plurality of terminals, and
circuitry configured to update a planned time scheduling for generating the time scheduling synchronized with the contents stream distributed by the transmission center, said circuitry configured to
partition each segment over time into a corresponding plurality of portions in accordance with video characteristics of said each segment;
monitor at least a selected subset of portions among the corresponding plurality of portions to extract corresponding video content features from the selected subset;
generate a corresponding fingerprint based on the extracted video content features, the fingerprint including a set of the extracted video content features;
compare said fingerprint with a reference fingerprint associated with such segment and having a plurality of corresponding reference content features by calculating a distance between each of the video content features and a corresponding one of the corresponding reference content features and calculating an average distance from the calculated distances;
assess at least one among an actual start time and an actual end time of such segment based on said comparison by comparing said average distance with a predetermined threshold; and
update the planned time scheduling based on the assessed at least one among the actual start time and the actual end time for generating the time scheduling synchronized with the contents stream.

8. The communication network of claim 7, wherein said circuitry is included in the transmission center.

9. The communication network of claim 7, wherein said circuitry is included in the terminals.

10. The communication network of claim 7, wherein the transmission center is a broadcasting center.

11. The communication network of claim 7, wherein said terminals include at least one among set-top box systems, digital media receivers, media centers, decoders, personal video recorders, and personal computers.

12. A non-transitory readable medium including computer executable instructions configured to run on a processing unit of a communication network for performing a method for generating a time scheduling of a contents stream distributed to a plurality of terminals, the contents stream being segmented in consecutive segments, each segment defining a corresponding program, the method comprising:
receiving auxiliary metadata comprising a planned time scheduling of the content stream which has been set in advance;
partitioning each segment over time into a corresponding plurality of portions in accordance with video characteristics of said each segment;
monitoring at least a selected subset of portions among the corresponding plurality of portions to extract corresponding video content features from the selected subset;
generating a corresponding fingerprint based on the extracted video content features, the fingerprint including a set of the extracted video content features;
assessing at least one among an actual start time and an actual end time of such segment based on a comparison between said fingerprint and a reference fingerprint associated with such segment and having a plurality of corresponding reference content features, said comparison between said fingerprint and said reference fingerprint including calculating a distance between each of the video content features and a corresponding one of the corresponding reference content features and calculating an average distance from the calculated distances, and wherein said assessing at least one among an actual start time and an actual end time includes comparing said average distance with a predetermined threshold; and
updating the planned time scheduling based on the assessed at least one among the actual start time and the actual end time so as to generate a time scheduling synchronized with the contents stream.

13. The method of claim 1, wherein each of the calculated distances is a spatial distance.

* * * * *